United States Patent [19]
Firestone

[11] Patent Number: 6,034,345
[45] Date of Patent: Mar. 7, 2000

[54] APPARATUS FOR REPAIRING HIGH TEMPERATURE PROCESS VESSELS

[75] Inventor: Carl Firestone, Vermilion, Ohio

[73] Assignee: Hot Tech Inc., Vermilion, Ohio

[21] Appl. No.: 09/014,733

[22] Filed: Jan. 28, 1998

[51] Int. Cl.[7] .................................................. B23K 9/10
[52] U.S. Cl. ............................. 219/98; 219/127; 219/99
[58] Field of Search ................................ 219/98, 99, 127

[56] References Cited

U.S. PATENT DOCUMENTS

| | | |
|---|---|---|
| 3,336,712 | 8/1967 | Bartley . |
| 3,506,250 | 4/1970 | Andersen . |
| 3,789,490 | 2/1974 | Kohart ..................................... 229/211 |
| 3,792,223 | 2/1974 | Spisak . |
| 3,800,983 | 4/1974 | Brichard et al. . |
| 3,813,210 | 5/1974 | Miskolczy et al. . |
| 4,019,013 | 4/1977 | Spisak ........................................ 219/98 |
| 4,160,148 | 7/1979 | Jenkins ....................................... 219/98 |
| 4,435,630 | 3/1984 | Jordan ........................................ 219/98 |
| 4,452,749 | 6/1984 | Kolvek et al. ............................. 264/30 |
| 4,562,328 | 12/1985 | Shoup ........................................ 219/98 |
| 4,956,540 | 9/1990 | Kohno et al. ............................ 219/127 |
| 5,039,835 | 8/1991 | Schwiete . |
| 5,321,226 | 6/1994 | Raycher .................................... 219/98 |

*Primary Examiner*—Patrick Ryan
*Assistant Examiner*—Anjan Dey
*Attorney, Agent, or Firm*—Wood, Herron & Evans, L.L.P.

[57] ABSTRACT

An apparatus for repairing high temperature process vessels while at or near their operating temperatures, which may be up to 3000° F. The apparatus includes a lance, a welding apparatus at the distal end of the lance, and power supply and control cabling within the lance. The welding apparatus is contained within a protective housing and both the lance and the housing may be either air- or water-cooled.

15 Claims, 5 Drawing Sheets

APPARATUS FOR REPAIRING HIGH TEMPERATURE PROCESS VESSELS

FIELD OF THE INVENTION

The present invention is directed to an apparatus for repairing kilns or other high temperature process vessels while at an elevated temperature.

BACKGROUND OF THE INVENTION

There are a wide variety of high-temperature process vessels which have a refractory material layer on the inside surface thereof. Examples include rotary kilns, including cement kilns and the burner pipes therein, mineral processing kilns, glass furnaces, copper smelters, aluminum smelters, vertical channel furnaces in foundries, and various steel making vessels. Such vessels, which have a steel shell and a refractory lining on the inside surface thereof, are subjected to temperatures up to 3000° F. or higher. In the construction of these vessels, typically a pattern of metal stud welded anchors are affixed to the steel shell of the kiln and a ceramic refractory lining is cast or bricked into place on the inside surface of the steel shell. The metal stud welded anchors retain the ceramic refractory lining on the inside surface of the kiln.

During use, the kiln or other high temperature process vessel is subject to significant temperature cycling which may cause cracking or deterioration of the refractory lining. In addition, the action of the material being processed, such as in a cement kiln, erodes the refractory lining. In fact, at some point the refractory lining crumbles or wears away and exposes the steel shell of the vessel. In order to repair the refractory lining, it may be necessary to affix a metal anchor to the shell wall by stud welding or some other welding technique and then apply ceramic refractory material at that location to complete the repair of the lining. One such technique for affixing metal anchors to the vessel shell is stud welding. This is a well known process and the necessary equipment, stud welding guns, are readily available.

Heretofore, due to limitations of available welding apparatus, including stud welding apparatus, the kiln must be shut down from operation and cooled to a temperature sufficiently low that an operator can enter the kiln and perform the repair, which may or may not involve stud welding of one or more metal anchors, and thereafter apply the refractory to repair the kiln lining. The repair may utilize the well known technique of ceramic welding or gunning. Shutting down a kiln and cooling it to a sufficiently low temperature to permit an operator to enter and perform the repair is exceedingly time consuming, and therefore costly. More particularly, due to the amount of down time of the kiln, significant revenue is lost based on lost throughput. Moreover, significant energy costs are associated with cooling down and reheating kilns for purposes of repair. Additionally, the actual cooling of the kiln may result in further damage due to the temperature cycling that it creates.

What is needed is an apparatus that permits the repair of process vessels, such as kilns, while at or near their operating temperatures and which requires only a small downtime in their usage.

SUMMARY OF THE INVENTION

The present invention is directed to an apparatus for repairing hot process vessels. More particularly, the invention provides a means for the repair of process vessels, such as kilns, maintained at or about their normal operating temperature, which may be in the range of several hundred degrees up to 3000° F. While the present invention is fully applicable to all types of process vessels which have a refractory lining that may need to be repaired, for convenience in the general and detailed description herein, reference will be made to a rotary kiln as the process vessel.

In accordance with one aspect of the present invention, a stud welding gun, or any other suitable type of welding apparatus, is pivotally fixed at the distal end of a protective lance and maintained within a protective housing. The lance may consist of a single or two or more concentric pipes, one of which (preferably the innermost) contains the cable(s) for powering and controlling the welding apparatus. Suitable high-temperature cables may be used in the apparatus. In the case of a single pipe, the cable(s) lay in the bottom and compressed air is fed through the pipe to cool the cables and protect them from the heat in the kiln. The compressed air also circulates through the protective housing for the welding apparatus, thereby keeping it cool, and is vented out through the protective housing at the distal end of the lance. In the case of a version using two concentric pipes, the power and control cable(s) are maintained inside the inner pipe and the compressed air is fed through the annular space between the inner and outer pipes. When the apparatus is to be used in extremely high temperature environments, it may be necessary to utilize a water-cooled lance. In that case, three concentric pipes may be used, with the cable(s) inside the innermost pipe, cooling water fed in through the annular space between the first and second pipes, and discharge cooling water returned via the annular space between the second and third pipes. The cooling water would circulate through the protective housing for the welding apparatus.

Again, while the invention is generally applicable for use with any type of welding apparatus, the invention is specifically applicable in the context of stud welding. In that context, the welding apparatus at the distal end of the lance is a stud welding gun of any type well known in the art. Such stud welding guns are readily available from TRW Nelson Stud Welding Division, Elyria, Ohio. It is noted that the invention contemplates other types of welding apparatus at the distal end of the lance, including MIG, TIG and arc welding apparatus. When one of those welding methods is selected, the appropriate welding apparatus is secured to the distal end of the lance and the necessary cabling for the power supply and control pass through the center pipe of the lance.

In use, an operator remains outside of the kiln and, after having prepared the area in need of repair, inserts the lance through a door in the firing hood for the kiln or any suitable access door to the kiln. Thus, even though the kiln is maintained at its operating temperature, which may range anywhere from several hundred degrees up to 3000° F., the operator is protected by remaining on the outside of the kiln. If the kiln is of the rotating variety, the only requirement is that rotation be ceased during the repair operation. The lance itself may be any suitable length from several feet to upwards of 40 feet, depending on the distance to the repair location inside the kiln. It is contemplated that the lance may be fabricated of pipe segments and if additional length is required, additional pipe segments are simply threaded together to provide the requisite length lance. The cabling within the interior pipe extends from the distal, welding end, through the center pipe to the proximal, operator end and is connected to a power supply and control unit. When air cooling is provided, the lance is connected to a compressed air source, such as are commonly found in plants with kilns, and when the lance is water-cooled it is connected to a water source. As the lance is passed into the kiln, it is simply balanced on the throughwall of the kiln. With longer lances, it may be necessary to provide a counterbalance of weights to maintain the balance of the lance.

In the case of a rotating kiln, rotation is preferably stopped during the repair operation with the repair zone located at about the five or six o'clock position. The distal end of the lance containing the welding device is manipulated and moved to be adjacent the kiln wall section to be repaired. In the case where the welding apparatus is a stud welding gun, the gun, which was previously loaded with a metal anchor, is positioned in contact with the shell wall and the anchor is affixed to the shell wall by the commonly practiced method of stud welding. Since the operator does not have direct access to the trigger for the stud welding gun, an external controller, such as a foot pedal, may be provided, to initiate the stud weld. To aid in manipulating the welding apparatus to the appropriate portion of the kiln shell, the protective housing for the welding apparatus is pivotally affixed to the distal end of the lance, thereby permitting the operator to access virtually any location within the kiln needing repair.

Once the metal anchor is welded in place, the operator removes the lance and reloads the stud welding gun with another anchor, if necessary, and repeats the process of attaching one or more additional anchors to the vessel shell. Thereafter, the operator performs the remainder of the repair operation, which typically involves ceramic welding or gunning of refractory material in place at the location(s) of the anchor(s), the details of which will not be described herein, but which are well known in the art.

BRIEF DESCRIPTION OF THE DRAWINGS

The foregoing and other features and advantages of the present invention will become more apparent to those skilled in the art to which the present invention relates from a reading of the following detailed description of a preferred embodiment, with reference to the accompanying drawings, in which.

DETAILED DESCRIPTION OF THE INVENTION

While the present invention is fully applicable in the context of repairing a wide variety of high temperature process vessels, the following detailed description, with reference to the accompanying drawings, refers to a rotary kiln as the particular type of vessel being repaired. This is done purely as an example and is in no way intended to be limiting of the scope of the present invention.

Figure 1:
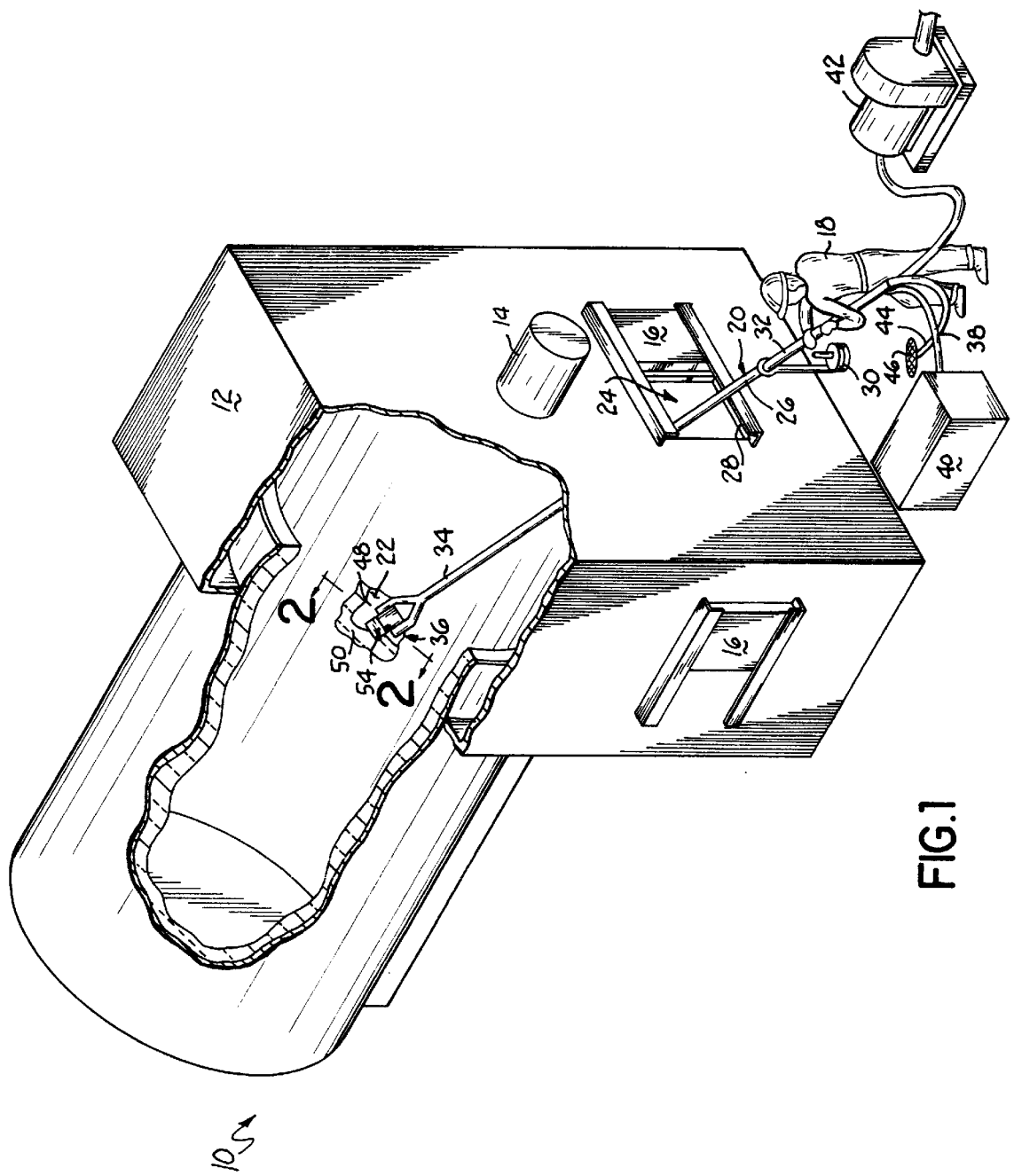
FIG. 1 is a perspective view of a rotary kiln showing an operator utilizing one embodiment of the apparatus of the present invention.

FIG. 1 shows a perspective view of a portion of a rotary kiln 10, and more particularly shows the end of kiln 10 adjacent firing hood 12. The firing hood has an end-fired burner 14 passing therethrough which heats the interior of rotary kiln 10. As shown, the firing hood typically has one or more access doors 16 on the front and sides thereof. An operator 18 is shown manipulating one embodiment of the repair apparatus 20 of the present invention to perform a portion of the repair operation of a section 22 of the sidewall of kiln 10. As shown in general in FIG. 1, operator 18 inserts repair apparatus 20, which is a welding lance, through the access hole 24 provided in firing hood 12 by access door 16. The lance portion 26 rests on the wall 28 of firing hood 12. Generally, the operator maintains the balance of the lance, but when extended length lances are utilized, a counterbalance 30 can be attached to the proximal end 32 of lance 26 to aid in the balancing. The distal end 34 of lance 26 has a pivotally connected welding apparatus 36 attached thereto. The proximal end 32 of lance 26 has outlets for power supply and control cabling 38, which is connected to a suitable power supply and control source 40 and which supplies power and control to welding apparatus 36. Additionally, if lance 26 is air cooled, proximal end 32 is connected to a suitable compressed air supply, such as a compressor 42 or an on-site compressed air supply line (not shown). Alternatively, but also shown in FIG. 1, lance 26 may be water-cooled, in which case a drain tube 44 is provided which drains the recirculated cooling water from proximal end 32 of lance 26. The recirculated cooling water may be discharged into a drain 46 for recycling within the plant.

Figure 2:
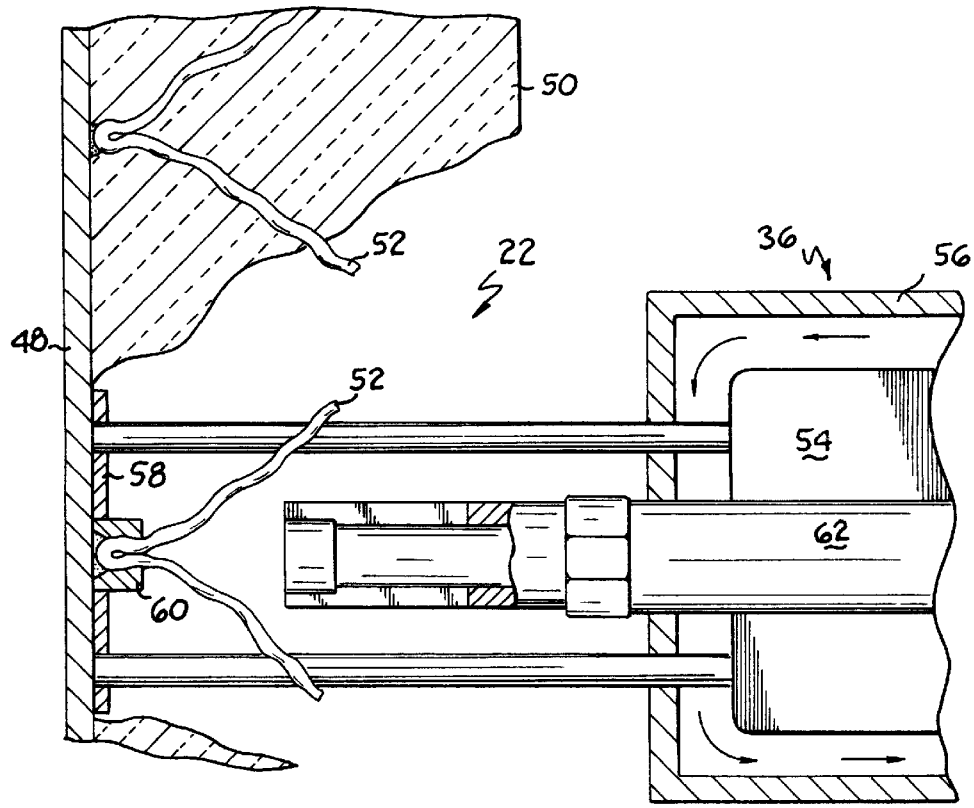
FIG. 2 is a cross-sectional view taken on line 2—2 of FIG. 1, showing a schematic representation of a portion of the welding apparatus engaged with the vessel wall.

With reference to FIG. 2, a schematic representation of a portion of welding apparatus 36 is shown in contact with the section 22 of the kiln sidewall needing repair. More particularly, the kiln has a steel shell sidewall 48 and a refractory material lining 50 which is held in place by metal stud anchors 52, which are welded to sidewall 48. Typically anchors 52 are welded to shell 48 during fabrication of the kiln utilizing stud welding, which is a technique well known in the art for applying stud anchors 52 to the sidewall 48 of a kiln, or other high-temperature process vessel. After a certain period of use of the kiln, damaged refractory areas 22 occur and require repair. So as to avoid shutting down the kiln entirely, which is operated at extremely high temperatures, the repair device 20 of the present invention is utilized and permits repairs to be made at or near the elevated operating temperatures of the vessel. FIG. 2 shows the distal end 36 of repair device 20 engaged with sidewall 48 of kiln 10. In particular, a portion of a stud welding gun 54 is shown within a protective stainless steel housing 56. As will be described in greater detail below, housing 56 may provide for the circulation of cooling air or water therethrough to protect the stud welding gun 54 (or other welding apparatus) from damage by the heat within kiln 10. This is necessary because utilizing the apparatus of the present invention the repair is effected while the kiln is substantially at its operating temperature, which may be anywhere up to 3000° F. Because housing 56 and stud welding gun 54 are pivotally attached to the distal end 34 of lance 26, the operator 18 can readily access virtually any repair location within kiln 10 by adjusting the length of lance 26. This may be accomplished by fabricating lance 26 of pipe sections, additional lengths of which can be threaded together to increase the lance length.

Figure 2A:
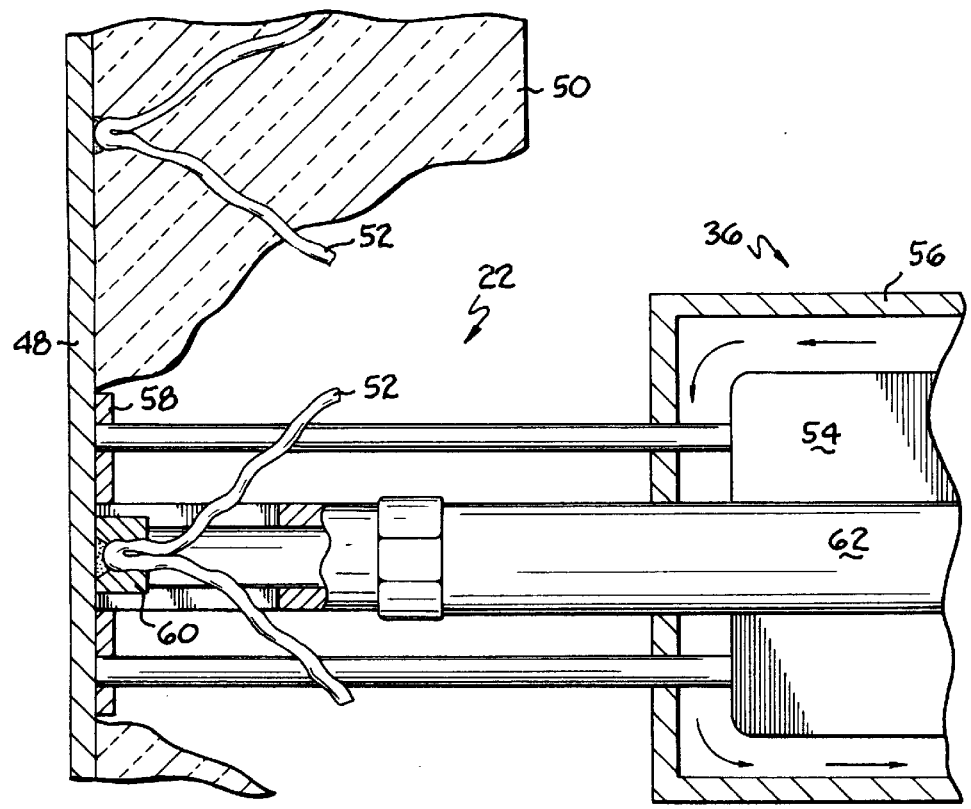
FIG. 2A is similar to FIG. 2 with the welding apparatus welding an anchor to the vessel wall.

The details of stud welding gun 54 will not be described herein and the gun is depicted only in schematic form for exemplary purposes. Suitable stud welding guns are available from TRW Nelson Stud Welding Division of Elyria, Ohio. One suitable stud welding gun, which has an aluminum housing, is TRW Nelson's Part No. 751-571-000. Because the details of stud welding guns and the method of performing stud welding are well known in the art, they will not be described in detail herein. For example, U.S. Pat. Nos. 4,594,495, 2,191,494, 3,336,712, 3,792,223, 4,562,328, and 4,160,148, the specifications of which are hereby incorporated herein by reference, relate to stud welding apparatus and methods, as well as to anchor studs. Suffice it to say that gun 54 at its forward end has an annular brass retaining plate 58 which retains annular ceramic collar or ferrule 60 therein. The metal stud anchor 52 is fitted within ferrule 60. As shown in FIG. 2, brass plate 58 contacts sidewall 48 of kiln 10 and ferrule 60 engages sidewall 48. At that point, and upon actuation of the gun, the welding portion thereof 62 moves forward and engages the ferrule and kiln sidewall 48 creating an arc that causes a weld to form between stud 52 and sidewall 48. FIG. 2A shows welding portion 62 of gun 54 in its forward position performing the welding operation.

Figure 2B:
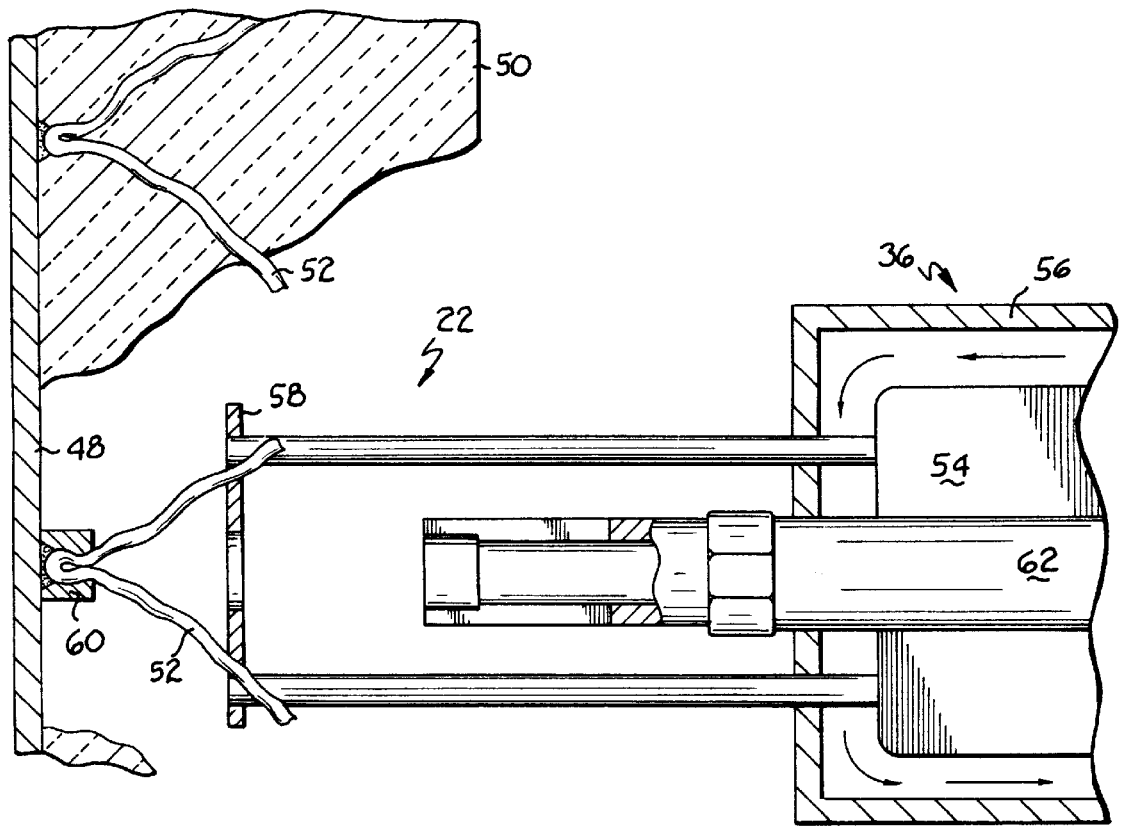
FIG. 2B is similar to FIGS. 2 and 2A wherein the welding apparatus is shown being retracted from the vessel wall and the anchor is welded in place.

With reference to FIG. 2B, stud welding gun 54 is retracted from engagement with sidewall 48 of kiln 10 by drawing lance 26 away from the sidewall, thereby leaving anchor 52 welded in place to the sidewall 48 and ferrule 60 remains captured between sidewall 48 and the branches of stud 52, as best seen in FIG. 2B.

Figure 3A:
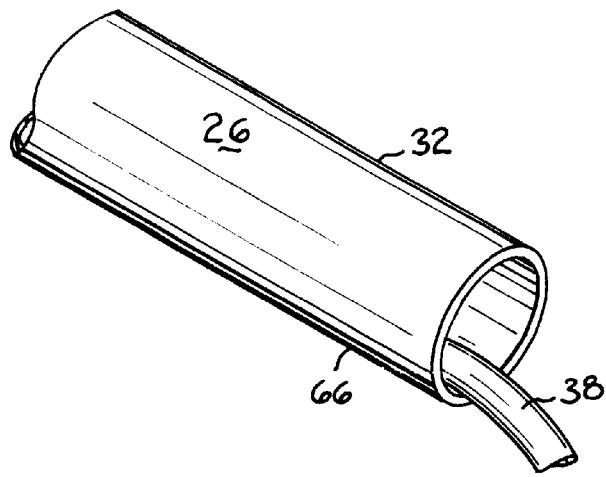
FIGS. 3A–3C are perspective views of the proximal end of three alternative embodiments of the present invention.
Figure 3B:
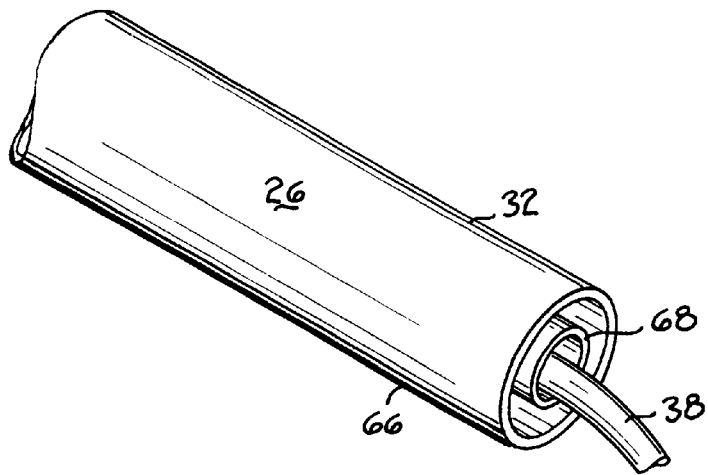
Figure 3C:
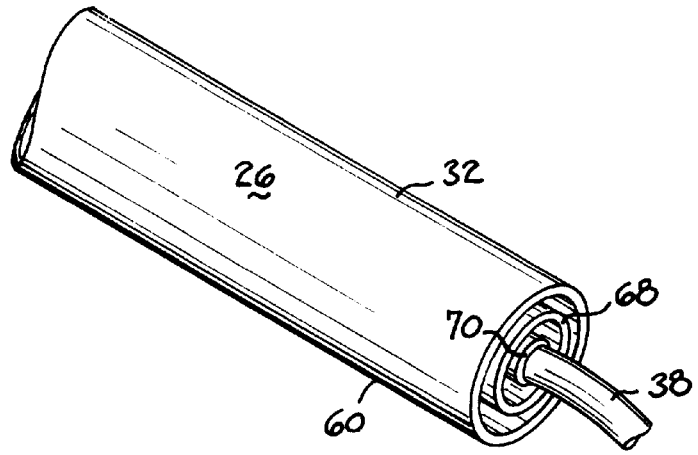

FIGS. 3A–3C show alternative embodiments, in perspective and partially broken away, of the proximal end 32 of lance 26. In the embodiment shown in FIG. 3A, a single pipe is used for the lance and the power supply and control cable(s) 38 simply reside within pipe 66. As an alternative, and as shown in FIG. 3B, concentric pipes 66 and 68 may be utilized. In this embodiment, which is suitable for air cooling, the cables 38 reside within inner pipe 68 and compressed cooling air may be fed into the annular space between pipes 66 and 68 to provide cooling for the lance 26. In this embodiment, although not specifically shown, the compressed air used for cooling the lance also circulates through the housing 56 for stud welding gun 54 to protect it from the deleterious effects of the high temperatures within the kiln. As yet another alternative, FIG. 3C shows an embodiment which is suitable for water cooling lance 26. A water cooled lance may be preferable when the process vessel which is being repaired is at extremely high temperatures. As shown in FIG. 3C, lance 26 comprises an outer pipe 66, an intermediate pipe 68 and an internal pipe 70, which contains the power supply and control cabling 38. Power supply and cabling 38 passes through inner pipe 70. Cooling water can be supplied in through the annular space between inner pipe 70 and intermediate pipe 68 and then travels the length of the lance 26, circulates through housing 56, as shown in FIG. 4, and returns in the outer annular space between intermediate pipe 68 and outer pipe 66.

Figure 4:
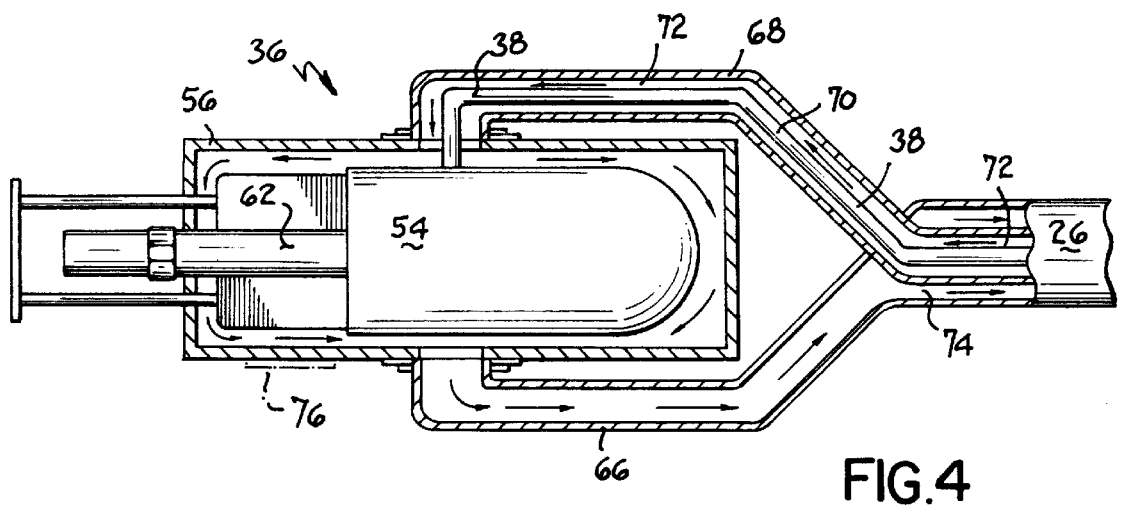
FIG. 4 is a schematic cross-section of the distal end of one embodiment of the apparatus of the present invention.

As shown in greater detail in FIG. 4, the water circulates in through the annular space 72 between inner pipe 70 and intermediate pipe 68 in the direction of the arrows. The circulating water passes into the interior of housing 56 thus providing cooling for stud welding gun 54. The water then flows back out of lance 26 in the direction of the arrows in the outer annular space 74 defined by intermediate pipe 68 and outer pipe 66. Again with reference to FIG. 1, a water outlet tube 44 from proximal end 32 of lance 26 discharges the water into a suitable drain 46. Likewise with reference to FIG. 1, the power supply and control cabling 38 is connected to a suitable power supply and controller 40 for welding apparatus 36. Such power supply and control units are readily available from TRW Nelson Stud Welding Division, Elyria, Ohio. As an alternative to a water-cooled lance, and as mentioned hereinabove, the lance may be cooled by the circulation of compressed air through the lance. In that embodiment, compressed air is injected into the interior of lance 26 at the proximal end and is exhausted via an exhaust port 76 in housing 56, shown in phantom in FIG. 4.

Figure 5:
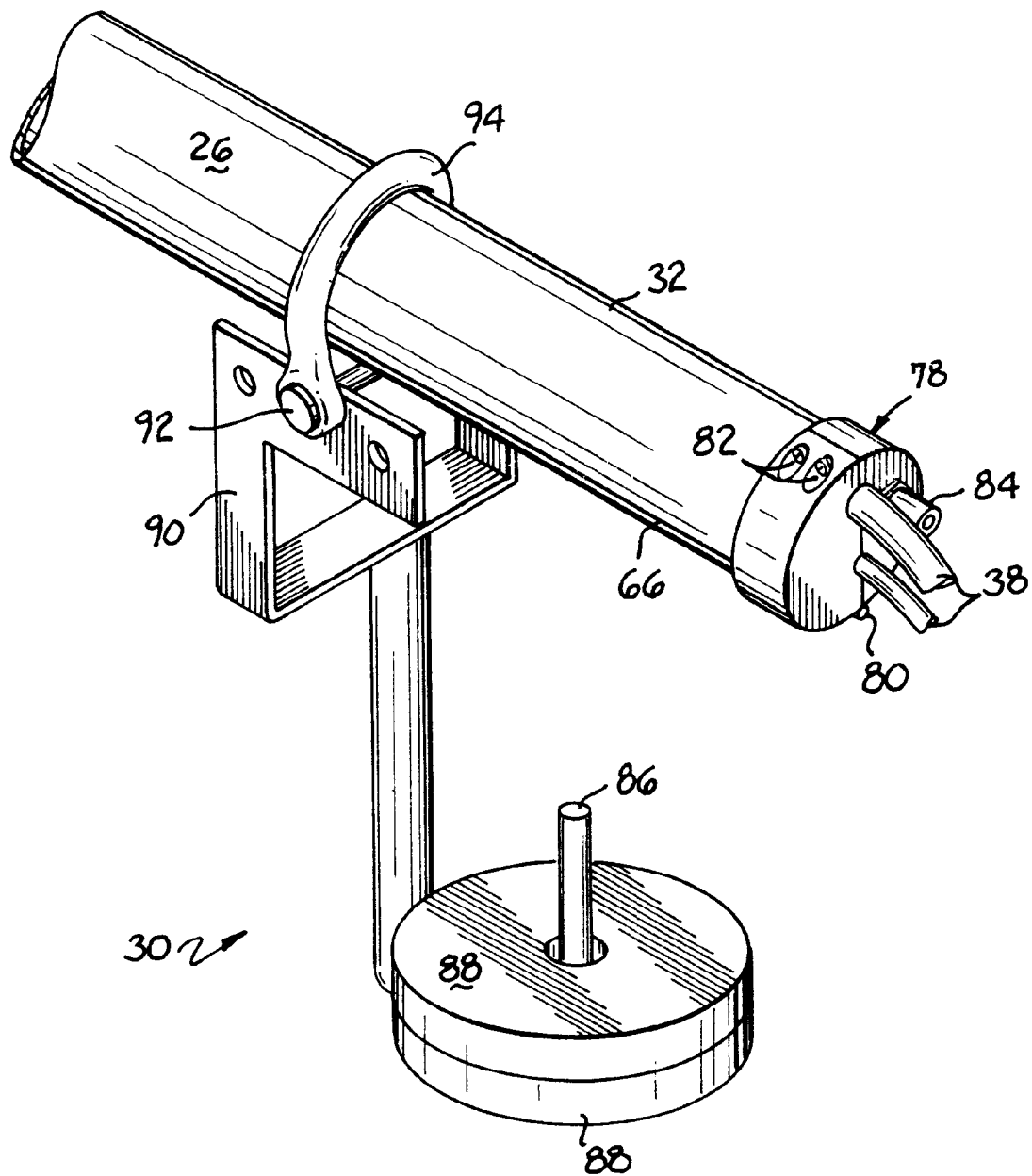
FIG. 5 is a perspective view, partially broken away, of the proximal end of one embodiment of the present invention.

While several embodiments of lance 26 are shown in FIGS. 3A–3C, none are shown with an end cap thereon. FIG. 5 depicts one embodiment of an end cap 78 for fitting on the proximal end 32 of lance 26. Preferably this is a machined part having a hinge 80 and threaded locking screws 82 to secure end cap 78 on distal end 32 of lance 26. End cap 78 is provided with throughbores to accommodate power supply and control cabling 38, as well as having a fitting 84 for the injection of compressed air. It will be appreciated that because lance 26 of the present invention is used in high temperature environments, cabling 38 is preferably of a type designed to withstand elevated temperatures. For example, Thermo-Trex 500 and Thermo 2800, available from TPC Wire & Cable, Cleveland, Ohio, are suitable for use in the present invention.

As was also described above and as shown in FIG. 1, a counterbalance apparatus 30 may be utilized to aid operator 18 in counterbalancing lance 26 when long lengths are being used. The details of the counterbalance mechanism 30 are shown in FIG. 5. More particularly, a pin 86 for receiving weights 88 thereon is affixed to the lower end of a yoke 90. The split yoke 90 has opposing holes therein which are in registration with one another and receive a pin 92 which also pass through the respective ends (only one shown) of a U-bolt 94. U-bolt 94 is placed over the proximal end 32 of lance 26 and the holes in the respective ends thereof are registered with the appropriate set of holes in the yoke 90 of counterbalance mechanism 30. Thereafter pin 92 is inserted to retain the counterbalance mechanism 30 on lance 26. As needed, additional weights 88 can be added to aid in the counterbalancing.

Subsequent to the welding of one or more anchors 52 in the kiln, the remainder of the repair operation is performed. Typically this involves ceramic welding or gunning of refractory material at the location(s) of the anchor(s). While the details of such operations and the associated equipment are not described herein, an understanding of those can be obtained by reference to U.S. Pat. Nos. 3,800,983, 4,911, 955, 4,967,686 and 5,128,075, the details of which are hereby incorporated herein by reference.

While the invention has been described with reference to specific details and embodiments, the scope of the present invention is not intended to be limited by such examples and details but rather is to be accorded a scope commensurate with the appended claims.

What is claimed is:

1. An apparatus for repairing high temperature process vessels, comprising:

a protective lance having a distal end and a proximal end, said protective lance adapted to be used inside a high temperature process vessel maintained at a temperature in the range of several hundred to 3000° F. and having a length sufficient for the operator to remain outside the high temperature process vessel;

a welding apparatus mounted to said distal end of said lance;

power supply cable housed within said protective lance for powering said welding apparatus.

2. The apparatus of claim 1 wherein said welding apparatus is a stud welding apparatus.

3. The apparatus of claim 1 wherein said protective lance comprises at least one pipe section.

4. The apparatus of claim 1 wherein said power supply cable is capable of withstanding high temperatures.

5. The apparatus of claim 1 wherein said welding apparatus is housed within a protective housing.

6. The apparatus of claim 5 wherein said welding apparatus and said housing are pivotally mounted to said distal end of said lance.

7. The apparatus of claim 1 further comprising a power supply and control unit for said welding apparatus.

8. The apparatus of claim 7 wherein said power supply cable is coupled to said power supply and control unit.

9. The apparatus of claim 1 wherein said lance is air-cooled.

10. The apparatus of claim 2 wherein said lance is water-cooled.

11. The apparatus of claim 1 further comprising a counterbalance apparatus at said proximal end of said lance.

12. The apparatus of claim 1 wherein said lance has an end cap at said proximal end.

13. The apparatus of claim 12 wherein said end cap has a compressed air inlet.

14. The apparatus of claim 1 wherein said lance comprises at least two concentric pipe sections.

15. The apparatus of claim 1 wherein said lance comprises at least three concentric pipe sections.

* * * * *